United States Patent
Oki et al.

(10) Patent No.: US 10,693,187 B2
(45) Date of Patent: *Jun. 23, 2020

(54) SOLID ELECTROLYTE MATERIAL AND ALL SOLID LITHIUM BATTERY

(71) Applicant: TOYOTA JIDOSHA KABUSHIKI KAISHA, Toyota-shi, Aichi-ken (JP)

(72) Inventors: Erika Oki, Susono (JP); Naoki Osada, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/108,791

(22) Filed: Aug. 22, 2018

(65) Prior Publication Data

US 2018/0366780 A1 Dec. 20, 2018

Related U.S. Application Data

(63) Continuation of application No. 15/202,627, filed on Jul. 6, 2016, now Pat. No. 10,158,144.

(30) Foreign Application Priority Data

Aug. 5, 2015 (JP) ................................ 2015-154927

(51) Int. Cl.
*H01M 10/0562* (2010.01)
*H01M 10/0525* (2010.01)
*C01D 15/00* (2006.01)

(52) U.S. Cl.
CPC ........ *H01M 10/0562* (2013.01); *C01D 15/00* (2013.01); *H01M 10/0525* (2013.01);
(Continued)

(58) Field of Classification Search
None
See application file for complete search history.

(56) References Cited

U.S. PATENT DOCUMENTS

| 2013/0164631 A1 | 6/2013 | Ohtomo et al. |
| 2017/0040636 A1* | 2/2017 | Oki .................. H01M 10/0562 |

FOREIGN PATENT DOCUMENTS

| JP | 2003-206111 A | 7/2003 |
| JP | 2013030440 A | 2/2013 |

(Continued)

OTHER PUBLICATIONS

Sep. 26, 2018 Notice of Allowance issued in U.S. Appl. No. 15/202,627.

(Continued)

*Primary Examiner* — Carmen V Lyles-Irving
(74) *Attorney, Agent, or Firm* — Oliff PLC

(57) ABSTRACT

A main object of the present invention is to provide a solid electrolyte material with high Li ion conductivity and heat stability. To achieve the above object, the present invention provides a solid electrolyte material comprising a composition of $Li_3PS_{4-x}O_x$ ($1 \leq x < 2$ or $2.4 < x \leq 3$), a crystal phase A having a peak at a position of $2\theta = 17.80° \pm 0.50°$, $25.80° \pm 0.50°$ in X-ray diffraction measurement using a CuKα ray, and a crystal phase B having a peak at a position of $2\theta = 22.30° \pm 0.50°$, $23.14° \pm 0.50°$, $24.80° \pm 0.50°$, $33.88° \pm 0.50°$, $36.48° \pm 0.50°$ in X-ray diffraction measurement using a CuKα ray.

4 Claims, 2 Drawing Sheets

(52) U.S. Cl.
CPC ...... *C01P 2002/72* (2013.01); *C01P 2006/40* (2013.01); *H01M 2300/0068* (2013.01)

(56) References Cited

FOREIGN PATENT DOCUMENTS

| JP | 2014-093263 A | 5/2014 |
|----|---------------|--------|
| JP | 2015-032462 A | 2/2015 |
| KR | 2013-0042580 A | 4/2013 |

OTHER PUBLICATIONS

Takada, K. et al., "Lithium ion conductive oxysulfide, Li3PO4—Li3PS4," Solid State Ionics, 2005, pp. 2355-2359, vol. 176.
Nov. 17, 2017 Office Action issued in U.S. Appl. No. 15/202,627.
Goto et al. (JP, 2012-113842) (a raw machine translation) (Abstract, Detailed Description and Drawings) (Jun. 14, 2012).
Apr. 19, 2018 Office Action issued in U.S. Appl. No. 15/202,627.

\* cited by examiner

SOLID ELECTROLYTE MATERIAL AND ALL SOLID LITHIUM BATTERY

CROSS-REFERENCE TO RELATED APPLICATIONS

This application is a continuation of application Ser. No. 15/202,627, filed on Jul. 6, 2016, which in turn claims priority to Japanese Patent Application No. 2015-154927, filed on Aug. 5, 2015. The disclosure of each of the prior applications is hereby incorporated herein by reference in its entirety.

TECHNICAL FIELD

The present invention relates to a solid electrolyte material with high Li ion conductivity and heat stability.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has presently drawn attention from the viewpoint of a high energy density among various kinds of batteries.

Liquid electrolyte containing a flammable organic solvent is used for a presently commercialized lithium battery, so that the installation of a safety device for restraining temperature rise during a short circuit and the structure for preventing the short circuit are necessary therefor. On the contrary, a lithium battery, namely a battery all-solidified by replacing the liquid electrolyte h a solid electrolyte layer, is conceived to intend the simplification of the safety device and be excellent in production cost and productivity for the reason that the flammable organic solvent is not used in the battery. A solid electrolyte material is usually used for an all solid lithium battery.

Patent Literature 1 discloses a sulfide solid electrolyte material wherein the sulfide solid electrolyte material is a glass ceramics comprising: an ion conductor having Li, A (A represents at least a kind of P, Si, Ge, Al or B), and S, LiX (X represents halogen), and ortho-oxo acid lithium; wherein the sulfide solid electrolyte material has a peak at a position of $2\theta=20.2°, 23.6°$; and a proportion of the ortho-oxo acid lithium is less than 20 mol %. Incidentally, Patent Literature 1 discloses $Li_3PS_4$ as the ion conductor and $Li_3PO_4$ as the ortho-oxo acid lithium.

CITATION LIST

Patent Literature

Patent Literature 1: Japanese Patent Application Laid-Open No. 2015-032462

SUMMARY OF INVENTION

Technical Problem

Conventional sulfide solid electrolyte materials (such as $Li_3PS_4$) tend to exhibit low heat stability. On the contrary, it is presumed that the heat stability may be improved by the usage of oxides such as ortho-oxo acid lithium (such as $Li_3PO_4$). In Patent Literature 1, the proportion of ortho-oxo acid lithium is 26 mol % at the maximum, but it is difficult to achieve the sufficient improvement of the heat stability with such the low proportion. Meanwhile, decrease in the Li ion conductivity is concerned when the proportion of ortho-oxo acid lithium is further increased.

The present invention has been made in view of the actual circumstances, and the main object thereof is to provide a solid electrolyte material with high Li ion conductivity and heat stability.

Solution to Problem

To achieve the above object, inventors have researched as hard as possible and obtained knowledge that a peak presumably derived from a new crystal phase is observed when the proportion of $Li_3PS_4$ is increased in the $Li_3PS_{4-x}O_x$ composition which falls under the tie-line composition of $Li_3PS_4$ and $Li_3PO_4$. Also, they have obtained knowledge that the solid electrolyte material has both of high Li ion conductivity and high heat stability. The present invention has been achieved based on these knowledges.

Namely, the present invention provides a solid electrolyte material comprising: a composition of $Li_3PS_{4-x}O_x$ ($1 \leq x \leq 3$), a crystal phase A having a peak at a position of $2\theta=17.80°\pm0.50°, 25.80°\pm0.50°$ in X-ray diffraction measurement using a CuKα ray, and a crystal phase B having a peak at a position of $2\theta=22.30°\pm0.50°, 23.14°\pm0.50°, 24.80°\pm0.50°, 33.88°\pm0.50°$, and $36.48°\pm0.50°$ in X-ray diffraction measurement using a Cukα ray.

According to the present invention, the specific composition having a crystal phase A and a crystal phase B allows a solid electrolyte material with high Li ion conductivity and heat stability.

In the invention, the solid electrolyte material preferably further contains LiX (X represents F, Cl, Br or I).

Also, the present invention provides an all solid lithium battery comprising a cathode active material layer, an anode active material layer, and a solid electrolyte layer formed between the cathode active material layer and the anode active material layer, wherein at least one of the cathode active material layer, the anode active material layer, and the solid electrolyte layer contains the solid electrolyte material described above.

According to the present invention, usage of the solid electrolyte material described above allows an all solid lithium battery with high output characteristic and high heat stability.

Advantageous Effects of Invention

The solid electrolyte material of the present invention exhibits high Li ion conductivity and heat stability as its effects.

DESCRIPTION OF EMBODIMENTS

Figure 1:
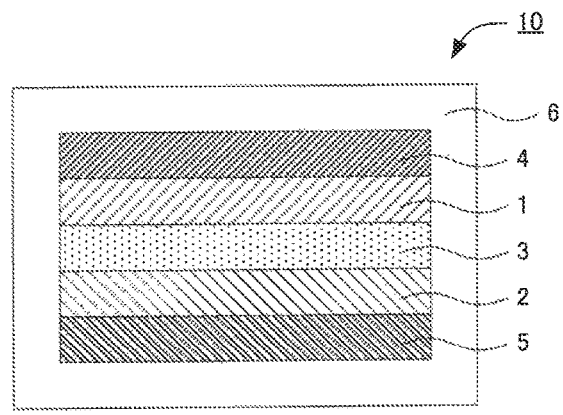
FIG. 1 is a schematic cross-sectional view illustrating an example of an all solid lithium battery of the present invention.

The solid electrolyte material and the all solid lithium battery of the present invention are hereinafter described in detail.

A. Solid Electrolyte Material

The solid electrolyte material of the present invention features the configuration that has a composition of $Li_3PS_{4-x}O_x$ ($1 \leq x \leq 8$), a crystal phase A having a peak at a position of $2\theta=17.80°\pm0.50°$, $25.80°\pm0.50°$ in X-ray diffraction measurement using a CuKα ray, and a crystal phase B having a peak at a position of $2\theta=22.30°\pm0.50°$, $23.14°\pm0.50°$, $24.80°\pm0.50°$, $33.88°\pm0.50°$, and $36.48°\pm0.50°$ in X-ray diffraction measurement using a CuKα ray.

According to the present invention, the specific composition having a crystal phase A and a crystal phase B allows a solid electrolyte material with high Li ion conductivity and heat stability. Also, the solid electrolyte material provides a crystal phase having a peak that falls under $Li_3PO_4$ so that the heat stability is improved.

Conventional sulfide solid electrolyte materials (such as $Li_3PS_4$ ceramics) tend to exhibit low heat stability, but the reason therefor is presumed to be that P—S bonding amount contained in the structure is excessive. P—S bonding may generate heat in some cases by the oxidization-reduction reaction at the time of the reaction with an O element in the charged-state cathode active material (the cathode active material being in a state that Li is desorbed). On the contrary, the solid electrolyte material of the present invention has fewer P—S bonding amount compared with that of $Li_3PS_4$ ceramics, and thus the heat generation start temperature may be improved.

The solid electrolyte material of the present invention has a composition of $Li_3PS_{4-x}O_x$ "Having a composition of $Li_3PS_{4-x}O_x$ ($1 \leq x \leq 3$)" refers to the configuration that has at least a composition of $Li_3PS_{4-x}O_x$ ($1 \leq x \leq 3$); may be only a composition of $Li_3PS_{4-x}O_x$ ($1 \leq x \leq 3$), and may be the composition including further components The value "x" may be 1.2 or more, may be 1.5 or more, and may be 2 or more. On the other hand, "x" may be 3.9 or less, and may be 2.5 or less. Also, as described above, $Li_3PS_{4-x}O_x$ falls under a tie-line composition of $L_3PS_{4-}$ (sulfide) and $Li_3PO_4$ (oxide). $Li_3PS_4$ and $Li_3PO_4$ fall under so-called ortho-composition.

The solid electrolyte material of the present invention may further contain LiX (X represents F, Cl, Br, or I). Li ion conductivity is improved by adding LiX. It is preferable that "x" is Cl, Br or I. In this case, the solid electrolyte material of the present invention is represented by aLiX·(100−a)$Li_3PS_{4-x}O_x$ ($0 \leq a$, $1 \leq x \leq 3$). The value "a" may be 0, and may be larger than 0. Above all, "a" is preferably 1 or more, and more preferably 10 or more. On the other hand, "a" is or less for example, and preferably 40 or less. Incidentally, the preferable range for "x" is the same as the description above.

The solid electrolyte material of the present invention provides a crystal phase A having a peak at a position of $2\theta=17.80°\pm0.50°$, $25.80°\pm0.50°$ in X-ray diffraction measurement using a CuKα ray. These peak positions may be within a range of $\pm0.30°$ and may be within a range of $\pm0.10°$. The crystal phase A is presumed to be a new crystal phase.

The solid electrolyte material of the present invention provides a crystal phase B having a peak at a position of $2\theta=22.30°\pm0.50°$, $23.14°\pm0.50°$, $24.80°\pm0.50°$, $33.88°\pm0.50°$, and $36.48°\pm0.50°$ in X-ray diffraction measurement using a CuKα ray. These peak positions may be within a range of $\pm0.30°$ and may be within a range of $\pm0.10°$. The peak of the crystal phase B is the peak falls under $Li_3PO_4$. Here, the peak falls under $Li_3PO_4$ includes not only a peak of $Li_3PO_4$ crystal phase in a strict sense, but also includes a crystal phase in which at least a part of elements of $Li_3PO_4$ crystal phase is added, lacked or substituted; for example, a crystal phase in which a part of an O element in $Li_3PO_4$ crystal phase is substituted with a S element is also included therein. In the present invention, when the strength at the peak in the vicinity of $2\theta=22.30°$ is regarded as $I_1$, and the strength at the peak in the vicinity of $2\theta=23.14°$ is regarded as $I_2$, the relation of $I_1 < I_2$ is preferably satisfied.

When the strength at the peak in the vicinity of $2\theta=17.80°$ (a peak of the crystal phase A) is regarded as $I_A$ and the strength at the peak in the vicinity of $2\theta=22.30°$ (a peak of the crystal phase B) is regarded as $I_B$, the value of $I_A/I_B$ preferably within a range of 0.2 to 1.4. Also, the solid electrolyte material of the present invention preferably does not have the peak of γ-$Li_3PS_4$. Typical peaks of γ-$Li_3PS_4$ appear at $2\theta=17.50°\pm0.50°$, $18.30°\pm0.50°$, $19.80°\pm0.50°$, $22.80°\pm0.50°$, $26.60°\pm0.50°$, $29.00°\pm0.50°$, and $30.40°\pm0.50°$.

P—S bonding amount (mol/g) contained in the structure of the sulfide solid electrolyte material is defined as follows P—S bonding amount=(molar ratio of $Li_3PS_4 \times 4$)/ (molar weight of $Li_3PS_{4-x}O_x$)

Four of P—S bonding exists in $Li_3PS_4$ so that the molar ratio of $Li_3PS_4$ is multiplied by 4 in the molecular of the above formula, P—S bonding amount contained in the structure of the sulfide solid electrolyte material is obtained by dividing the result by molar weight of $Li_3PS_{4-x}O_x$ (g/mol). P-S bonding amount may be 0.007 mol/g or more, and may be 0.008 mol/g or more. On the other hand, P—S bonding amount may be 0.020 mol/g or less, and may be 0.016 mol/g or less.

The solid electrolyte material preferably has high Li ion conductivity, and the Li ion conductivity at the normal temperature (25° C.) is preferably $1\times10^{-4}$ S/cm or more for example, and more preferably $1\times10^{-3}$ S/cm or more. Also, in the solid electrolyte material, the heat generation start temperature in the later described DSC measurement is preferably 180° C. or more for example, and more preferably 185° C. or more. Also, the shape of the solid electrolyte material is not particularly limited, but the examples may include granular shape. In addition, the average particle diameter ($D_{50}$) of the solid electrolyte material is within a range of 0.1 μm to 50 μm for example. Use of the solid electrolyte material is not particularly limited and examples thereof ray include an arbitrary use that utilizes the Li ion conductivity. Above all, the solid electrolyte material of the present invention is preferably used for an all solid lithium battery.

Also, the solid electrolyte material of the present invention may be used for an arbitrary use that utilizes the Li ion conductivity. Above all, the solid electrolyte material of the present invention is preferably used for an all solid lithium battery.

Examples of the methods for producing the solid electrolyte material of the present invention may include a method comprising steps of: a preparing step of preparing a raw material composition containing $Li_2S$, $P_2S_5$, and $Li_3PO_4$, and having a composition of $Li_3PS_{4-x}O_x$ ($1 \leq x \leq 3$), an amorphizing step of forming an amorphous body by amorphizing the raw material composition, and a heating treatment step of improving the crystallinity. A glass ceramics is obtained thereby.

In the preparing step, starting materials to be used for the raw material composition are not particularly limited. For example, a simple substance of P and a simple substance of S may be used instead of $P_2S_5$. Also, as described above, the raw material composition may further contain LiX (X represents F, Cl, Br or I).

Examples of the methods for amorphizing the raw material composition in the amorphizing step may include mechanical milling methods such as ball mill and vibration mill, and a melt quenching method. The mechanical milling method may be a dry mechanical milling or a wet mechanical milling, but the latter is preferable in the view of uniform treatment. The kind of dispersion mediums to be used for the wet mechanical milling is not particularly limited. Incidentally, the amount of raw materials (such as $Li_2S$, $P_2S_5$, Li $PO_4$) that may be stuck to the crushing media (such as a ball) and to the side of the pot varies, and thus the composition deviation may possibly be caused as the result Also, the status of the crushed $Li_2S$ varies according to the conditions for the mechanical milling, and thus the existing proportion of simple $Li_2S$ may vary in some cases. In the present invention, the condition for the mechanical milling is preferably selected so as not to leave $Li_2S$ crystal in the obtained amorphized body (so as not to show the peak of $Li_2S$ crystal in XRT measurement). Incidentally, in the case of premixing raw materials by agate mortar for example, $Li_2S$ crystal is preferably crushed as much as possible.

The heating temperature in the heating treatment step is 350° C. or more for example, preferably 400° C. or more, and more preferably 500° C. or more. On the other hand, the heating temperature is 1000° C. or less for example. The heating time is appropriately adjusted so as to obtain the desired crystal phase. Examples of the heating atmosphere may include inert goo atmosphere and vacuum atmosphere.

B. All Solid Lithium Battery

FIG. 1 is a schematic cross-sectional view illustrating an example of an all solid lithium battery of the present invention. The all solid lithium battery 10 in FIG. 1 has a cathode active material layer 1, an anode active material layer 2, a solid electrolyte layer 3 formed between the cathode active material layer 1 and the anode active material layer 2, a cathode current collector 4 for collecting currents of the cathode active material layer 1, an anode current collector 5 for collecting currents of the anode active material layer 2, and a battery case 6 for storing these members. In the present invention, at least one of the cathode active material layer 1, the anode active material layer 2, and the solid electrolyte layer 3 contains the above described solid electrolyte material.

According to the present invention, usage of the above described solid electrolyte material allows an all solid lithium battery with high output characteristic and high heat stability.

The all solid lithium battery of the present invention is hereinafter described in each constitution.

1. Cathode Active Material Layer

The cathode active material layer in the present invention is a layer containing at least a cathode active material. Also, the cathode active material layer may contain at least one of a conducting material, a binding material, and a solid electrolyte material, other than the cathode active material.

Examples of the cathode active material may include an oxide active material, and a sulfide active material. Specific examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$, spinel type active materials such as $LiMn_2O_4$, and $Li$ $(Ni_{0.5}Mn_{1.5})O_4$, and olivine type active materials such as $LiFePO_4$, $LiMnPO_4$, $LiNiPO_4$, and $LiCuPO_4$. Also, arbitrary polyanionic active material containing polyanion such as $PO_4^{3-}$, $SiO_4^{4-}$, and $BO_3^{3-}$ may be used as the cathode active material. The operation potential of the cathode active material is preferably 3.0 V (Li/Li$^+$) or more.

The surface of the cathode active material may be coated with a coating layer. The reason therefor is to restrain the cathode active material from reacting with the solid electrolyte material. Examples of the materials for the coating layer may include Li ion conductive oxides such as $LiNbO_3$, $Li_3PO_4$, and LiPON. The average thickness of the coating layer is preferably within a range of 1 nm to 20 nm for example, and more preferably within a range of 1 nm to 10 nm.

Examples of the conducting material may include carbon materials such as acetylene black, Ketjen black, VGCF, and graphite. Examples of the binding material may include fluoride-containing binding materials such as polyvinylidene fluoride (PVDF). Examples of the solid electrolyte material may include a sulfide solid electrolyte material, and an oxide solid electrolyte material. Above all, it is preferable that the solid electrolyte material described in "A. Solid electrolyte material" above used. Also, the thickness of the cathode active material layer is preferably within a range of 0.1 μm to 1000 μm, for example.

2. Anode Active Material Layer

The anode active material layer in the present invention is a layer containing at least an anode active material. Also, the anode active material layer may contain at least one of a conducting material, a binding material, and a solid electrolyte material, other than the anode active material.

Examples of the anode active material may include a metal active material, and a carbon active material. Examples of the metal active material may include In, Al, Si and Sn. On the other hand, examples of the carbon active material may include mesocarbon microbeads (MCMB), highly oriented pyrolytic araphite (HOPE), hard carbon, and soft carbon.

The conducting material, the binding material, and the solid electrolyte material are in the same contents as those described above. Also, the thickness of the anode active material layer is preferably within a range of 0.1 μm to 1000 μm for example.

3. Solid Electrolyte Layer

The solid electrolyte layer in the present invention is a layer containing at least a solid electrolyte material. Also, the solid electrolyte layer may contain the binding material other than the solid electrolyte material. The solid electrolyte material and the binding material are in the same contents as those described above. Also, the thickness of the solid electrolyte layer is preferably within a range of 0.1 μm to 1000 μm, for example.

4. Other Constitutions

The all solid lithium battery of the present invention usually has a cathode current collector for collecting currents of the cathode active material layer and an anode current collector for collecting currents of the anode active material layer. Examples of the material for the cathode current collector may include SUS, aluminum, nickel, iron, titanium, and carbon. On the other hand, examples of the material for the anode current collector may include SUS, copper, nickel, and carbon. Also, a battery case for a general battery may be used for the battery case, and the examples thereof may include a battery case made of SUS.

5. All Solid Lithium Battery

The all solid lithium battery of the present invention may be a primary battery or a secondary battery, but preferably a secondary battery among them. The reason therefor is to be repeatedly charged and discharged and be useful as a car-mounted battery, for example. Incidentally, the primary battery includes usage of a battery as a primary battery (usage for the purpose of just one time discharge after charging). Examples of the shape of the battery of the present invention may include a coin shape, a laminate shape, a cylindrical shape, and a rectangular shape.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described in more details by showing examples hereinafter.

Example 1

Lithium sulfide ($Li_2S$, manufactured by Nippon Chemical Industrial Co., Ltd,), phosphorus pentasulfide ($P_2S_5$, manufactured by Sigma-Aldrich Co. LLC.), and lithium phosphate ($Li_3PO_4$) were used as the starting materials. Next, $Li_2S$, $P_2S_5$ and $Li_3PO_4$ were mixed in a glove box which is under Ar atmosphere (dew point: −70° C.) at the molar ratio of $Li_2S:P_2S_5:Li_3PO_4=56.25:18.75:25$. This composition ratio falls under $Li_3PS_4:Li_3PO_4=3:1$, and falls under x=1 in $Li_3PS_{4-x}O_x$.

The weight of 2 g of this mixture was mixed by using an agate mortar for 10 minutes. The obtained mixture was put in a pot of a planetary ball mill (45 cc, made of $ZrO_2$) together with $ZrO_2$ ball (ϕ=10 mm, 10 pieces) to hermetically seal the pot completely (Ar atmosphere). This pot was mounted on a planetary ball milling machine (P7™ manufactured by Fritsch Japan Co., Ltd.) to perform mechanical milling for 1 hour treatment and 15 minutes pause as a set, at the number of weighing table revolutions of 400 rpm, 40 sets. Thereby, a solid electrolyte glass (amorphous body) as obtained. The obtained solid electrolyte glass did not have a peak of $Li_2S$ in XRD measurement. This solid electrolyte glass was dissolved into powders and pelleted. The pellet was put in a test tube and vacuum-sealed. The temperature thereof was raised to 500° C. at the temperature rising speed of 5° C./minute, the state was kept for 10 hours and then naturally cooled down. The glass ceramics (solid electrolyte material) was obtained thereby.

Examples 2 to 5, Comparative Examples 1 to 3

A solid electrolyte material was obtained in the same manner as in Example 1 except for changing the ratio of $Li_2S$, $P_2S_5$, and $Li_3PO_4$ to satisfy the composition shown in Table 1.

Example 6

LiI was used in addition to $Li_2S$, $P_2S_5$ and $Li_3PO_4$ as the starting materials. A solid electrolyte material was obtained in the same manner as in Example 1 except for changing the ratio of $Li_2S$, $P_2S_5$, $Li_3PO_4$, and LiI to satisfy the composition of $aLiI·(100-a)Li_3PS_{4-x}O_x$ (a=20, x=2), and changing the amount of the raw material composition to 2.35 g (0.35 g of LiI was added).

Example 7

A solid electrolyte material was obtained in the same manner as in Example 6 except for changing the ratio of $Li_2S$, $P_2S_5$, $Li_3PO_4$, and LiI to satisfy the composition of $aLiI·(100-a)Li_3PS_{4-x}O_x$ (a=20, x=3). Incidentally, the compositions of Examples 1 to 7 and Comparative Examples 1 to 3, and P—S bonding amount calculated by the raw material composition are shown in Table 1.

TABLE 1

| | Composition | x in $Li_3PS_{4-x}O_x$ | P-S bonding amount (mol/g) |
|---|---|---|---|
| Comparative Example 1 | $Li_3PS_4:Li_3PO_4 = 1:0$ | 0 | 0.0222 |
| Example 1 | $Li_3PS_4:Li_3PO_4 = 0.75:0.25$ | 1 | 0.0183 |
| Example 2 | $Li_3PS_4:Li_3PO_4 = 0.5:0.5$ | 2 | 0.0135 |
| Example 3 | $Li_3PS_4:Li_3PO_4 = 0.4:0.6$ | 2.4 | 0.0113 |
| Example 4 | $Li_3PS_4:Li_3PO_4 = 0.29:0.71$ | 2.84 | 0.0086 |
| Example 5 | $Li_3PS_4:Li_3PO_4 = 0.25:0.75$ | 3 | 0.0076 |
| Comparative Example 2 | $Li_3PS_4:Li_3PO_4 = 0.22:0.78$ | 3.12 | 0.0068 |
| Comparative Example 3 | $Li_3PS_4:Li_3PO_4 = 0:1$ | 4 | 0 |
| Example 6 | $Li_3PS_4:Li_3PO_4 = 0.5:0.5$, LiI added | 2 | 0.0135 |
| Example 7 | $Li_3PS_4:Li_3PO_4 = 0.25:0.75$, LiI added | 3 | 0.0076 |

[Evaluation]

(X-Ray Diffraction Measurement)

Figure 2:
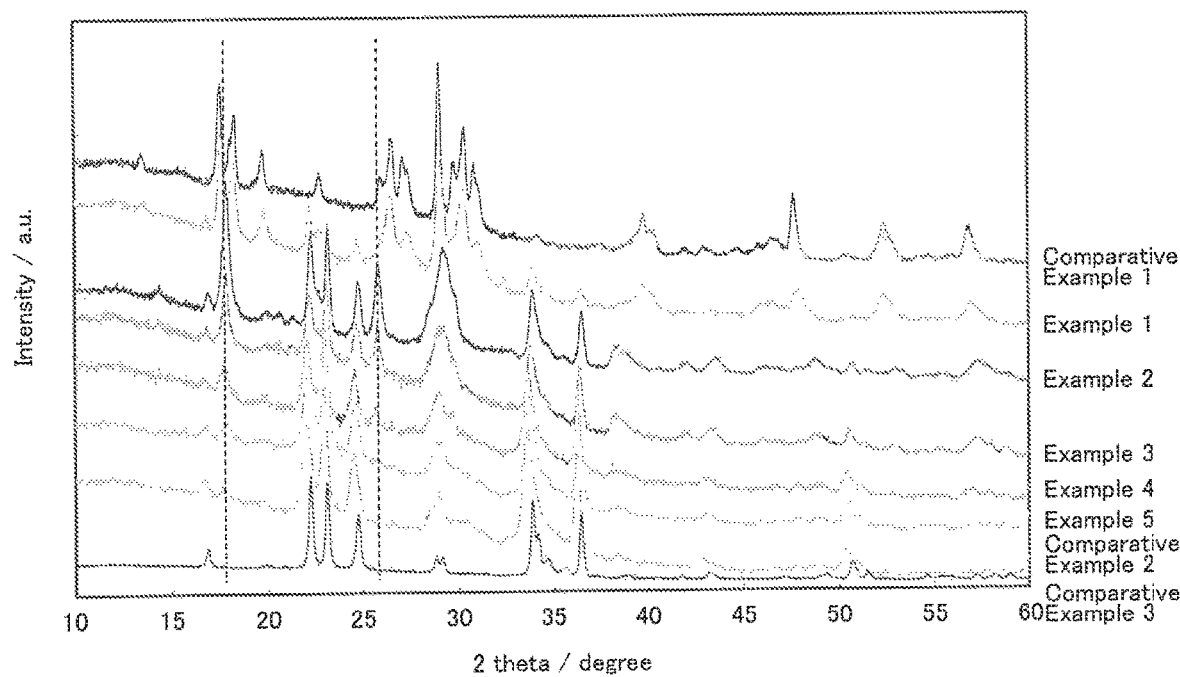
FIG. 2 is the results of XRD measurement for the solid electrolyte materials obtained in Examples 1 to 5 and Comparative Examples 1 to 3.

X-ray diffraction (XRD) measurement using a CuKα ray was performed to the solid electrolyte materials obtained in Examples 1 to 5 and Comparative Examples 1 to 3. The measurement was conducted by using a powder X-ray diffraction apparatus RINT-Ultima III™ (manufactured by Rigaku Corporation) within a range of 2θ=10° to 60°. The result is shown in FIG. 2. AS shown in FIG. 2, peaks at the positions of 2θ=17.80°, and 25.80° were observed in Example 2. These peaks are presumed to be a peak of the crystal phase A and were observed in other Examples as well. On the other hand, in Comparative Example 3 ($Li_3PO_4$), peaks at the positions of 2θ=22.30°, 23.14°, 24.80°, 33.88°, and 36.48° were observed. These peaks are the peaks of the crystal phase B and were observed in Examples 1 to 5 as well. In these manners, it was confirmed that the solid electrolyte materials obtained in Examples 1 to 5 have the crystal phase A and the crystal phase B.

Incidentally, a peak of the crystal phase A in Example 1 is not clearly observed due to the effect from the similar peak to Comparative Example 1 (the peak of γ-$Li_3PS_4$), but the peak of the crystal phase A was observed when peak separation was conducted. Also, in Examples 1 to 5, the value of $I_A/I_B$ was obtained by taking the strength of the peak in the vicinity of θ=17.80° (a peak of the crystal phase A) for $I_A$ and taking the strength of the peak in the vicinity of 2θ=22.30° (a peak of the crystal phase E) for $I_3$. The result is shown in Table 2.

(Li Ion Conductivity Measurement)

The weight of 100 mg of the solid electrolyte material obtained in Examples 1 to 7 and Comparative Examples 1 to 3 was put in a cell and temporary-pressed at 10 kN for 1 minute to obtain a solid electrolyte layer. Next, 19 μm thick carbon coating foil was disposed on both sides of the obtained solid electrolyte layer, the both edges of the solid electrolyte layer were pinched by SUS pin, 8 kN pressure was applied to the cell, and then bound with a boat of 6 N torque. In this manner, a cell for evaluating the Li ion conductivity was obtained. Impedance measurement was performed for the obtained evaluation cells and the Li ion conductivity was measured. The result is shown in Table 2.

(DSC Measurement)

First, a cathode mixture was fabricated by using the solid electrolyte material obtained in Examples and Comparative Examples respectively. A cathode active material (LiNi$_{1/3}$Co$_{1/3}$Mn$_{1/3}$O$_2$, rock salt bed type active material), a carbon black (manufactured by Denki Kagaku Kogyo Kabushiki Kaisha), and the solid electrolyte material were put into dehydrated heptane, which is the dispersion medium, at the volume ratio of cathode active material:carbon black:solid electrolyte material=62.5:37.5:5. After that, the mixture was stirred for 10 minutes by using an ultrasonic homogenizer. After that, the dehydrated heptane in the dispersion liquid was removed by using a hot stirrer at 80° C., and the dispersion liquid was dried and solidified to obtain a cathode mixture.

Next, a cell for evaluating the heat stability was fabricated by using the obtained cathode mixture. The weight of 200 mg of the solid electrolyte material was put in a cylinder made of macole, and pressed at 98 MPa to obtain a pellet of the solid electrolyte layer. In the same manner, 200 mg of cathode mixture was put in a cylinder made of macole, and pressed at 98 MPa to obtain a pellet of the cathode active material layer. The obtained solid electrolyte layer and cathode active material layer were laminated, both sides thereof were pinched with pistons made of SUS current collector), and confined with three bolts (torque=2 Nm, surface pressure=–15 MPa). In this manner, a cell for evaluating the heat stability was obtained. After that, the evaluation cell was put in a container made of glass and hermetically sealed.

The hermetically sealed evaluation cell was charged. After that, the evaluation cell was disassembled to take out the cathode mixture therefrom. The weight of 5 g of the cathode mixture was put in a heat-resistant hermetic container and a differential scanning calorimetry was performed within a range of room temperature to 500° C. to measure the heat generation start temperature. The temperature rising speed was 10° C./minute, and Al$_2$O$_3$ was used as a standard test sample. The result is shown in Table 2.

TABLE 2

| | x in Li$_3$PS$_{4-x}$O$_x$ | P-S bonding amount (mol/g) | I$_A$/I$_B$ | Li ion conductivity (S/cm) | Heat generation start temperature (° C.) |
|---|---|---|---|---|---|
| Comparative Example 1 | 0 | 0.0222 | 0 | 1.8 × 10$^{-5}$ | 145 |
| Example 1 | 1 | 0.0183 | 1.0 | 5.0 × 10$^{-5}$ | 165 |
| Example 2 | 2 | 0.0135 | 1.4 | 2.5 × 10$^{-4}$ | 193 |
| Example 3 | 2.4 | 0.0113 | 1.2 | 2.0 × 10$^{-4}$ | — |
| Example 4 | 2.84 | 0.0086 | 0.4 | 4.4 × 10$^{-5}$ | — |
| Example 5 | 3 | 0.0076 | 0.2 | 1.8 × 10$^{-5}$ | 225 |
| Comparative Example 2 | 3.12 | 0.0068 | 0.1 | 1.0 × 10$^{-5}$ | — |
| Comparative Example 3 | 4 | 0 | 0 | 1.7 × 10$^{-9}$ | — |
| Example 6 | 2 | 0.0135 | — | 5.1 × 10$^{-3}$ | — |
| Example 7 | 3 | 0.0076 | — | 5.9 × 10$^{-4}$ | — |

Figure 3:
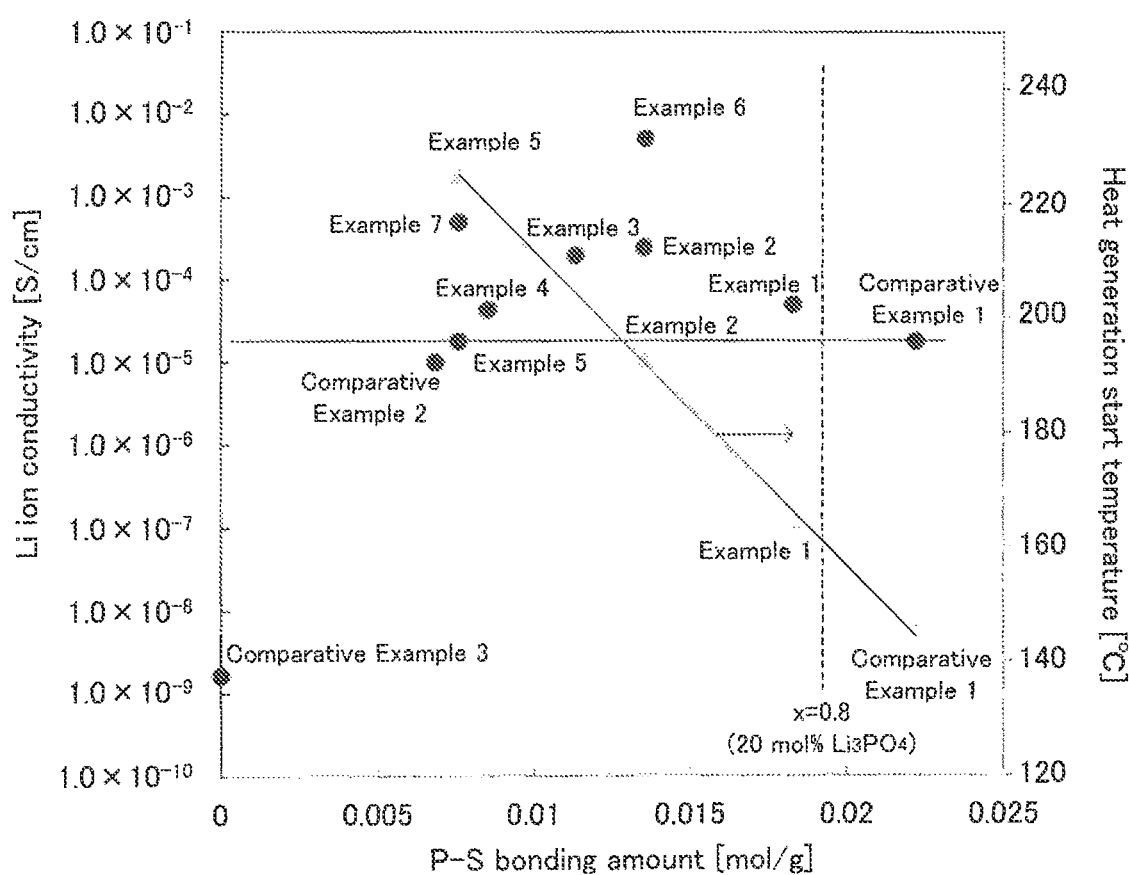
FIG. 3 is a graph showing the relation of P—S bonding amount, Li ion conductivity, and heat generation start temperature of the solid electrolyte materials obtained in Examples 1 to 7 and Comparative Examples 1 to 3.

Also, the relation of P—S bonding amount, Li ion conductivity, and heat generation start temperature is shown in FIG. 3. As shown in FIG. 3, Li ion conductivity of Examples 1 to 7 was equivalent to or more than that of Comparative Example 1 (Li$_3$PS$_4$). Also, the heat generation start temperature of Examples 1 to 7 was higher than that of Comparative Example 1 (Li$_3$PS$_4$). That is to say, it was confirmed that the solid electrolyte material having the composition of Li$_3$PS$_{4-x}$O$_x$ (1≤x≤3), the crystal phase A, and the crystal phase B, has high Li ion conductivity and heat stability. Also, in Examples 6 and 7, Li ion conductivity became higher than that of Examples 1 to 5 since LiI was added. Incidentally, in Comparative Example 2 (x=3.12), there is a possibility that the crystal phase A is segregated a little in FIG. 2, but the Li ion conductivity was lower than that of Comparative Example 1 (x=0, Li$_3$PS$_4$). The reason therefor is presumed to be that the amount of the crystal phase B (Li$_3$PO$_4$) became excessive, and thus the Li ion conduction path in the crystal phase A was disconnected.

Also, in Examples 1 to 5 and Comparative Examples 1 and 2 in FIG. 3, the Li ion conductivity was changed curvedly and the highest Li ion conductivity was obtained in Example 2. The reason therefor is presumed to be related to the existing ratio of the crystal phase A and the crystal phase B. Specifically, in the case P—S bonding amount is much, it is presumed that the amount of the crystal phase B is small so that the amount of the crystal phase A to be produced is small, and thus much γ-Li$_3$PS$_4$ is produced as the result. On the other hand, in the case P—S bonding amount is few, it is presumed that although much of Li element, P element, and S element forms the crystal phase A, the amount of the crystal phase B (Li$_3$PO$_4$) becomes excessive, and thus the Li ion conduction path is disconnected. In Example 2, it is presumed that the crystal phase A is sufficiently produced, and also, the amount of the crystal phase B (Li$_3$PO$_4$) is appropriate so that the highest Li ion conductivity was exhibited.

REFERENCE SIGNS LIST 1 cathode active material layer
2 anode active material layer
3 solid electrolyte layer
4 cathode current collector
5 anode current collector
6 battery case
10 all solid lithium battery

What is claimed is:
1. A solid electrolyte material comprising: a composition of Li$_3$PS$_{4-x}$O$_x$ (1≤x≤3) comprising
   a crystal phase A having a peak at positions of 2θ=17.80°±0.50° and 25.80°±0.50° in an X-ray diffraction measurement using a CuKα ray, and
   a crystal phase B having a peak at positions of 2θ=22.30°±0.50°, 23.14°±0.50°, 24.80°±0.50°, 33.88°±0.50°, and 36.48°±0.50°, and the peak at

23.14°±0.50° has a higher intensity than the peak at 24.80°±0.50°, in the X-ray diffraction measurement using a CuK α ray wherein when the strength at the peak at the position of 2α=17.80°±0.50° is regarded as $I_A$ in the X-ray diffraction measurement using a CuKa ray and the strength at the peak at the position of 2 θ=22.30°±0.50° is regarded as $I_B$ in the X-ray diffraction measurement using a CuKα ray, the value of $I_A/I_B$ is 1.2 or more.

2. An all solid lithium battery comprising a cathode active material layer, an anode active material layer, and a solid electrolyte layer formed between the cathode active material layer and the anode active material layer, wherein at least one of the cathode active material layer, the anode active material layer, and the solid electrolyte layer contains the solid electrolyte material according to claim 1.

3. The solid electrolyte material according to claim 1, wherein the composition of $Li_3PS_{4-x}O_x$, has an onset temperature of heat generation of 180° C. or more and 225° C. or less, as determined by differential scanning calorimetry.

4. The solid electrolyte material according to claim 3, wherein the onset temperature of heat generation is 185° C. or more and 225° C. or less, as determined by differential scanning calorimetry.

\* \* \* \* \*